No. 643,167. Patented Feb. 13, 1900.
G. SEARS.
COMBINED PUNCHING, SHEARING, AND PLOW WELDING MACHINE.
(Application filed Sept. 6, 1898.)
(No Model.) 2 Sheets—Sheet 1.
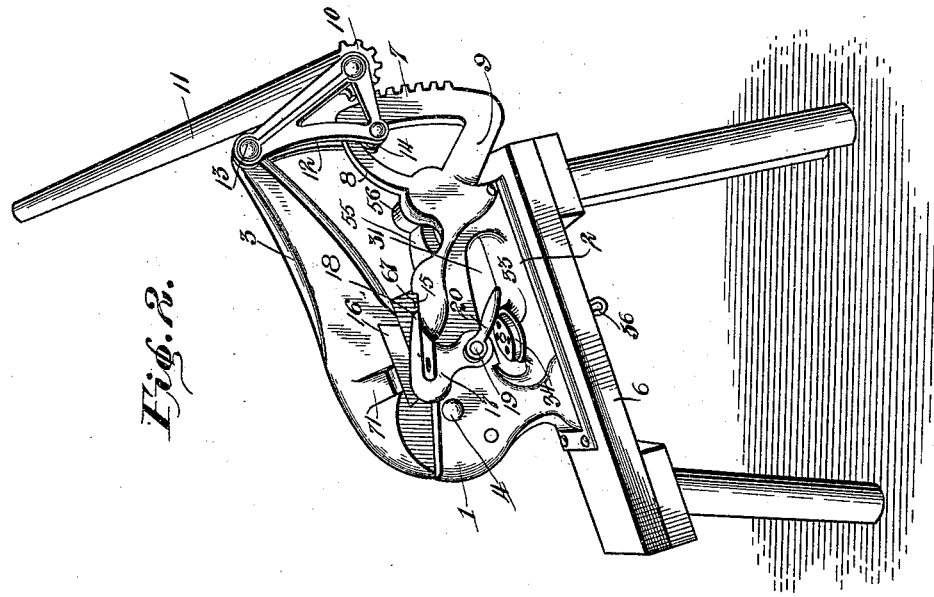
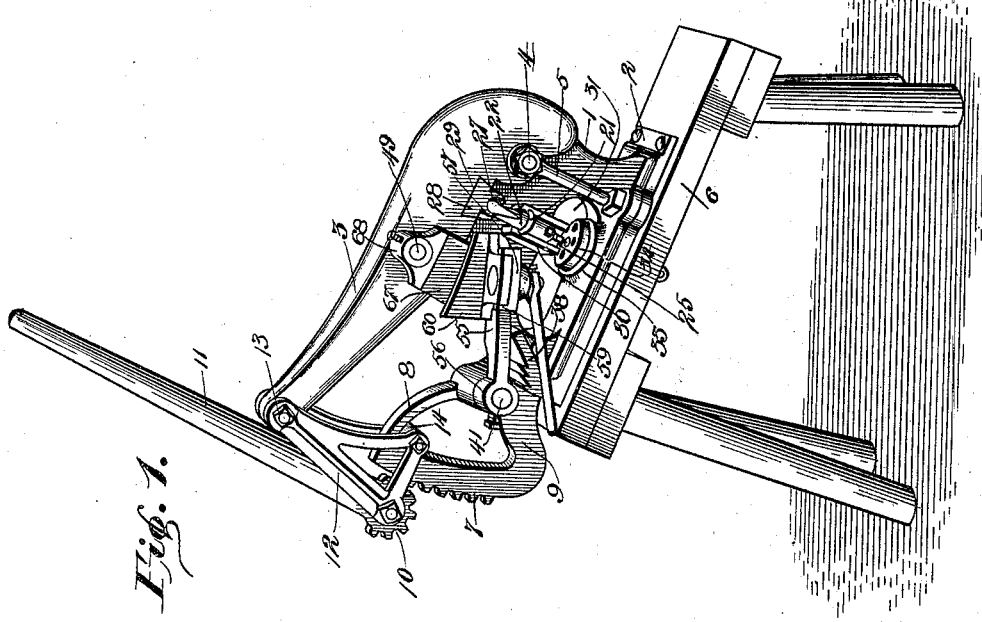
Witnesses
Clarence M. Walker,
H. F. Riley
George Sears   Inventor
By his Attorneys,
C. A. Snow & Co.

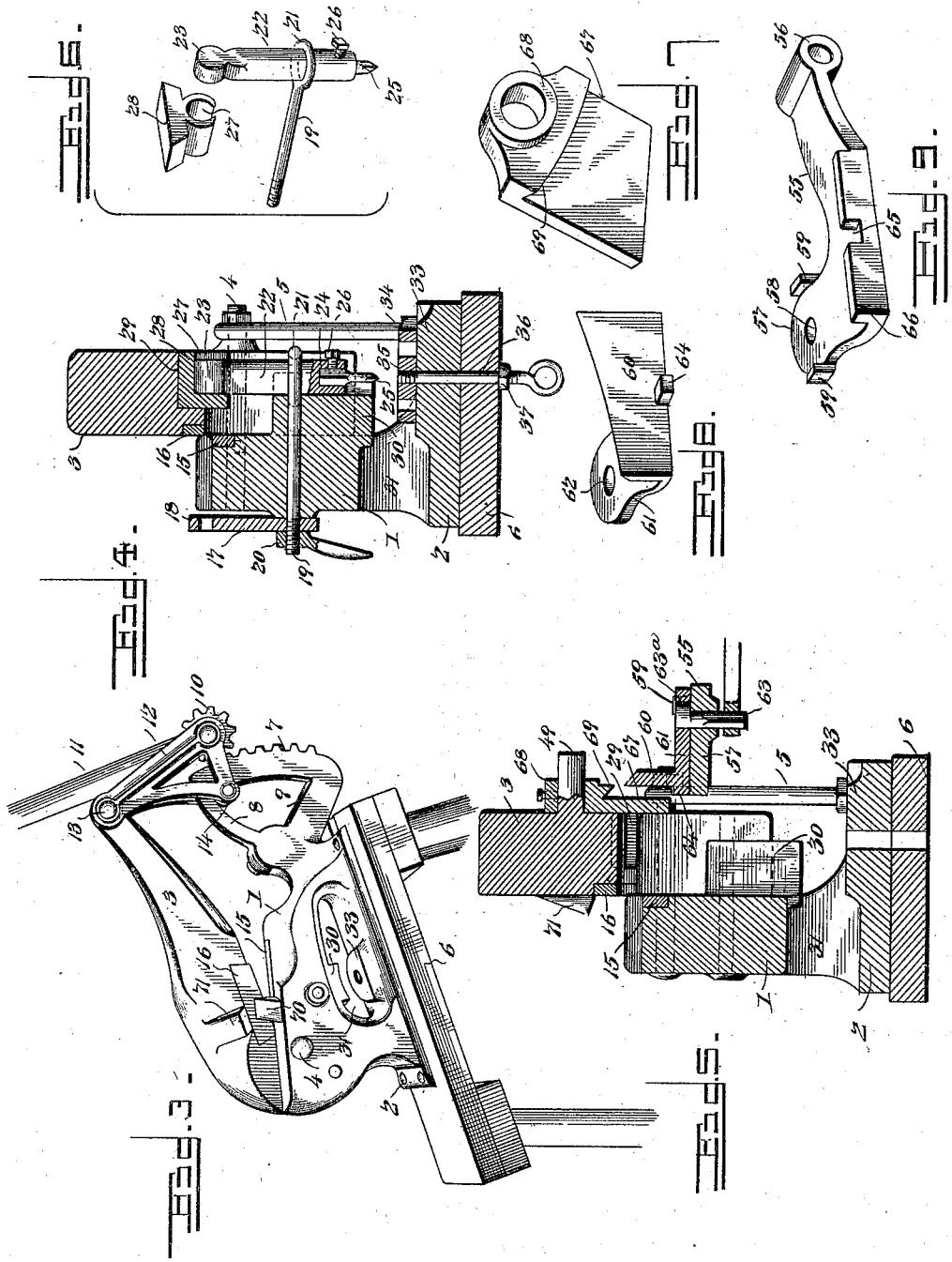

United States Patent Office.

GEORGE SEARS, OF ONSLOW, IOWA.

COMBINED PUNCHING, SHEARING, AND PLOW-WELDING MACHINE.

SPECIFICATION forming part of Letters Patent No. 643,167, dated February 13, 1900.

Application filed September 6, 1898. Serial No. 690,316. (No model.)

*To all whom it may concern:*

Be it known that I, GEORGE SEARS, a citizen of the United States, residing at Onslow, in the county of Jones and State of Iowa, have invented a new and useful Combined Punching, Shearing, and Plow-Welding Machine, of which the following is a specification.

The invention relates to a combined punching, shearing, and plow-welding machine.
The object of the present invention is to improve the construction of the machine shown and described in Patent No. 540,275, granted to me June 4, 1895, and to increase the strength, durability, and efficiency of the same, and to enable the machine to be employed for welding plowshares to the landside of plows.

The invention consists in the construction and novel combination and arrangement of parts hereinafter fully described, illustrated in the accompanying drawings, and pointed out in the claims hereto appended.

In the drawings, Figure 1 is a perspective view of a machine constructed in accordance with this invention, showing the front side thereof. Fig. 2 is a similar view showing the rear side of the machine. Fig. 3 is a perspective view showing the parts arranged for sharpening horseshoe-calks. Figs. 4 and 5 are transverse sectional views. Fig. 6 is a detail perspective view of the punch, showing the parts separated. Figs. 7, 8, and 9 are detail views showing the parts of the device for operating on plows.
Like numerals of reference designate corresponding parts in all the figures of the drawings.

1 designates a lower stationary jaw formed integral with a flat base-plate 2 and coöperating with a movable jaw 3, which is pivoted at its rear end to the stationary jaw by a transverse bolt 4 or other suitable fastening device supported at one side of the machine by a rod 5. The flat base-plate is perforated for the reception of bolts or other suitable fastening devices and is mounted on a bench 6, but any other suitable support may be employed.

The stationary jaw and the base form the body portion of the machine, which is provided at its front with an integral curved rack-bar 7, connected with the stationary jaw by upper and lower rack-bars 8 and 9. The curved rack-bar, which has a smooth inner or rear edge, is provided at its front edge with teeth that mesh with corresponding teeth 10, formed on the head of an operating-lever 11, and the latter is connected with the movable jaw 3 by a substantially triangular link-frame 12, composed of two similar sides and having its base extending across the rack-bar 7. The sides and bottom of each member of the link-frame are formed integral with one another. The upper end of the said frame 12 is pivoted to the front end of the movable jaw at 13, the sides or members being located at opposite sides of the same, and a roller 14 is located at the lower inner angle of the frame and slides on the smooth inner edge of the rack-bar to reduce the friction to a minimum. By oscillating the operating-lever 11 its teeth are caused to mesh with those of the rack-bar, and the pivoted jaw 3 is moved to and from the stationary jaw and this movement is utilized for operating the punching, shearing, and plow-welding devices hereinafter described.

The stationary and movable jaws are provided at their adjacent edges with suitable knives or blades 15 and 16, and in order to hold the material down to the work a hook 17 is employed. The hook 17, which is clearly illustrated in Figs. 3 and 5 of the accompanying drawings, consists of a shank and a head and has its bill 18 elongated and disposed at right angles to it. The inner side or edge of the opening of the head of the hook is flush with the upper edge of the stationary jaw, and the bill 18, which is located above the stationary jaw, is adapted to engage the material operated on. The shank of the hook is perforated for the passage of a horizontal rod or pin 19, extending transversely through the stationary jaw, as clearly shown in Fig. 4 of the accompanying drawings, and having one end threaded to receive a nut 20, which is preferably provided with a handle to enable it to be screwed tightly against the hook. The other end of the rod or pin 19 is provided with an eye or head 21, which receives a punch 22, consisting of a shank or body portion provided at the top with a head 23 and having a socket 24 at its lower end to receive a tool 25, secured in place by a clamping-screw 26. By this construction the tool and the body portion 22 are separate, and by connecting them in the manner shown a minimum amount of metal is required for the tool, which may be readily removed and replaced. The head 23 is rounded and fits in a horizontal socket or eye 27 of a dovetailed block 28, which is fitted in a corresponding recess 29 of the movable jaw, as clearly illustrated in Fig. 1 of the accompanying drawings. The transverse or horizontal eye 27 is provided at the bottom with an opening to receive the neck of the punch, and the opening is of sufficient size to permit the necessary play of the parts incident to the pivotal movement of the jaw 3. The punch is guided in suitable ways 30, formed by parallel bosses or flanges, preferably integral with the stationary jaw and located at the top of an opening 31, between the central portion of the stationary jaw and the base 2 of the machine. The bosses or flanges of the ways 30 are also provided at their inner faces with corresponding grooves 32, which form a seat for the eye or head 21 of the rod or pin 19, and the latter retains the punch in the eye of the block 28, and as the inner end of the eye is closed, as illustrated in Fig. 4 of the drawings, the said rod 19 will also retain the dovetailed block in the recess of the movable jaw.

The flat base-plate is provided at a point opposite the punch with an annular boss or enlargement 33, on which is seated a rotary die or head adapted to coöperate with the punch and provided with an annular series of apertures of different sizes. The die or head 34, which is adapted to be adjusted to bring any one of its apertures beneath the punch, is provided with a central threaded opening to receive and engage a threaded upper end 35 of a pivot or pin 36, which passes through registering perforations of the base or bed of the machine and the bench. The lower end of the pin or pivot 36 is provided with a head and is threaded adjacent to the same to receive a nut 37, which engages the lower face of the bench, whereby the die or head is retained at any desired adjustment.

The stationary jaw is provided with an integral flange or ledge 38, which supports a plate 55. The lower or outer end of the supporting-plate 55, which is stationary, is provided with an eye 56 to receive a pivot or stud 41, and its rear end has an outwardly-extending arm 57, provided with a perforation 58 and having opposite lugs 59, arranged to support a stationary welding-jaw 60. The welding-jaw 60 has an upwardly-extending blade portion and is provided with a bottom portion or arm 61, conforming to the configuration of the arm 57 of the supporting-plate and provided with a perforation 62, registering with the perforation 58 and receiving a pin or bolt 63. The welding-jaw 60 has a beveled welding edge and is provided with a centrally-arranged rearwardly-extending lug 64, which fits in a corresponding recess 65, formed in a flange 66, extending upward from the back of the supporting-plate 65.

The stationary welding-jaw coöperates with the movable welding-jaw 67, consisting of a plate or body provided at the top with a head or enlargement 68, having an eye to receive a pivot or stud 49, and the jaw 67 and the supporting-plate 55 are retained in position by suitable clamping-screws mounted on the eyes of those parts and engaging the pivots or studs 41 and 49, as clearly shown in Fig. 1 of the accompanying drawings. The enlargement 68 forms a lower shoulder, which is beveled to form a welding edge 69, and the lower portion of the body or plate of the welding-jaw 67 depends below the welding edge and supports the point of the plowshare in welding the same.

The bolt or pin 63, which passes through the registering perforations 58 and 62, is provided with an eccentrically-arranged head 63$^a$, which works in the perforation 62, and when the pin or bolt is rotated it is adapted to slide the lower welding-jaw laterally of the machine and move it to and from the upper welding-jaw, whereby it is capable of clamping and firmly holding the landside of a plow between the welding-jaws during the welding operation.

As illustrated in Fig. 3 of the accompanying drawings, the machine may be arranged for sharpening horseshoe-calks, and the horseshoe-calk-sharpening device consists of a lower removable die 70 and an upper integral member 71. The die 70, which is substantially triangular in side elevation, is provided with a depending shank, which fits in a corresponding perforation or socket of the stationary jaw, and the upper member, which presents a lower flat edge to the calk, is carried by the movable jaw.

Changes in the form, proportion, size, and the minor details of construction within the scope of the appended claims may be resorted to without departing from the spirit or sacrificing any of the advantages of this invention.

What is claimed is—

1. A combined punching, shearing and welding machine comprising stationary and movable jaws provided with cutters located at one side of the movable jaw, a punch and die arranged at the other side of the movable jaw, the upper and lower welding-jaws located at the same side of the machine as the punch and arranged in advance of the same and mounted respectively on the movable and stationary jaws, and means for operating the movable jaw, whereby the punch, the cutters and the welding-jaws will be simultaneously operated, substantially as described.

2. A combined punching, shearing and welding machine comprising stationary and movable jaws having cutters, a hook arranged at one side of the machine and having an extended bill located above the stationary jaw and arranged adjacent to the cutters, a punch located at the other side of the machine and connected with the movable jaw, and the upper and lower welding-jaws located at the same side of the machine as the punch and mounted on the movable and stationary jaws, substantially as described.

3. A combined punching, shearing and welding machine comprising stationary and movable jaws having cutters, a hook arranged at one side of the machine and having an extended bill located above the stationary jaws adjacent to the cutters, a block arranged at the other side of the machine and detachably interlocked with the movable jaw, a punch arranged at the same side of the machine and detachably secured to the said block, a transverse rod passing through the stationary jaw and securing the hook to the same and provided with an eye receiving the punch and forming a guide for the same, whereby the rod is adapted to retain the punch in engagement with the block and the block in engagement with the movable jaw, and the welding-jaws arranged at the same side of the machine as the punch and connected with the stationary and movable jaws, substantially as described.

4. A combined punching, shearing and welding machine comprising stationary and movable jaws having cutters arranged at one side of the movable jaw, a punch located at the other side of the movable jaw, the supporting-plate arranged at the same side of the machine as the punch and mounted on the stationary jaw and provided at its inner end with an arm having oppositely-disposed lugs, said supporting-plate being provided at its back with a flange having a recess, a lower welding-jaw fitted between the lugs and provided at its back with a lug engaging the said recess, and an upper welding-jaw mounted on the movable jaw, substantially as described.

In testimony that I claim the foregoing as my own I have hereto affixed my signature in the presence of two witnesses.

GEORGE SEARS.

Witnesses:
T. H. LIGHTFOOT,
H. D. HALL.